United States Patent [19]
Wagner et al.

[11] 3,812,307
[45] May 21, 1974

[54] RETRACTABLE CORD ASSEMBLY WITH ELECTRIC SWITCH INTEGRALLY ASSOCIATED WITH ROTATABLE REEL HOUSING MEMBER

[75] Inventors: Everett F. Wagner, Northfield; Joseph J. Sidlo, North Barrington; Lawrence J. Rischke, Jr., Mount Prospect, all of Ill.

[73] Assignee: Bell & Howell Company, Chicago, Ill.

[22] Filed: Jan. 24, 1973

[21] Appl. No.: 326,322

[52] U.S. Cl. .......... 200/52 R, 200/153 F, 191/12.4
[51] Int. Cl. .................... H01h 35/00, H02g 11/00
[58] Field of Search ...... 200/52 R, 153 F; 191/12.4, 191/12.2 R, 12.2

[56] References Cited
UNITED STATES PATENTS

| | | |
|---|---|---|
| 3,657,491 | 4/1972 | Ryder et al. .................. 191/12.2 R |
| 2,825,924 | 3/1958 | Humphrey ..................... 200/153 F |
| 1,858,538 | 5/1932 | Coolick ....................... 191/12.4 UX |
| 1,751,836 | 3/1930 | Moone ........................... 200/153 F |
| 3,585,324 | 6/1971 | Renndorfer ..................... 200/52 R |

*Primary Examiner*—James R. Scott

[57] ABSTRACT

A control system for remotely controlling electrical devices from a plurality of locations. The system includes a stationary housing member, and electrical switching and circuit means joined for rotating in unison. The terminal end of a power cord is connected with said circuit means and is rotatable therewith. The simultaneous rotation of said switch and circuit means readily maintains the electrical continuity of the system.

7 Claims, 6 Drawing Figures

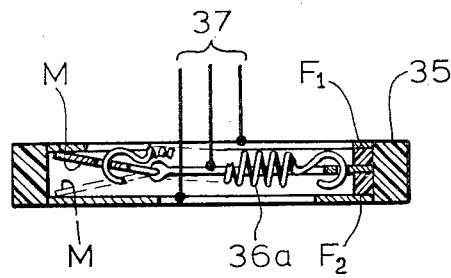
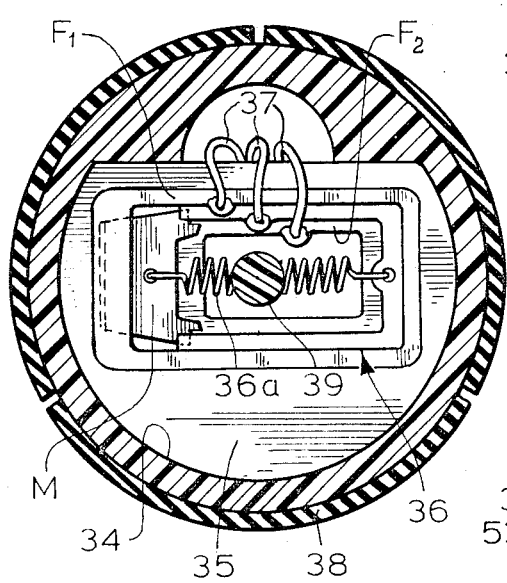
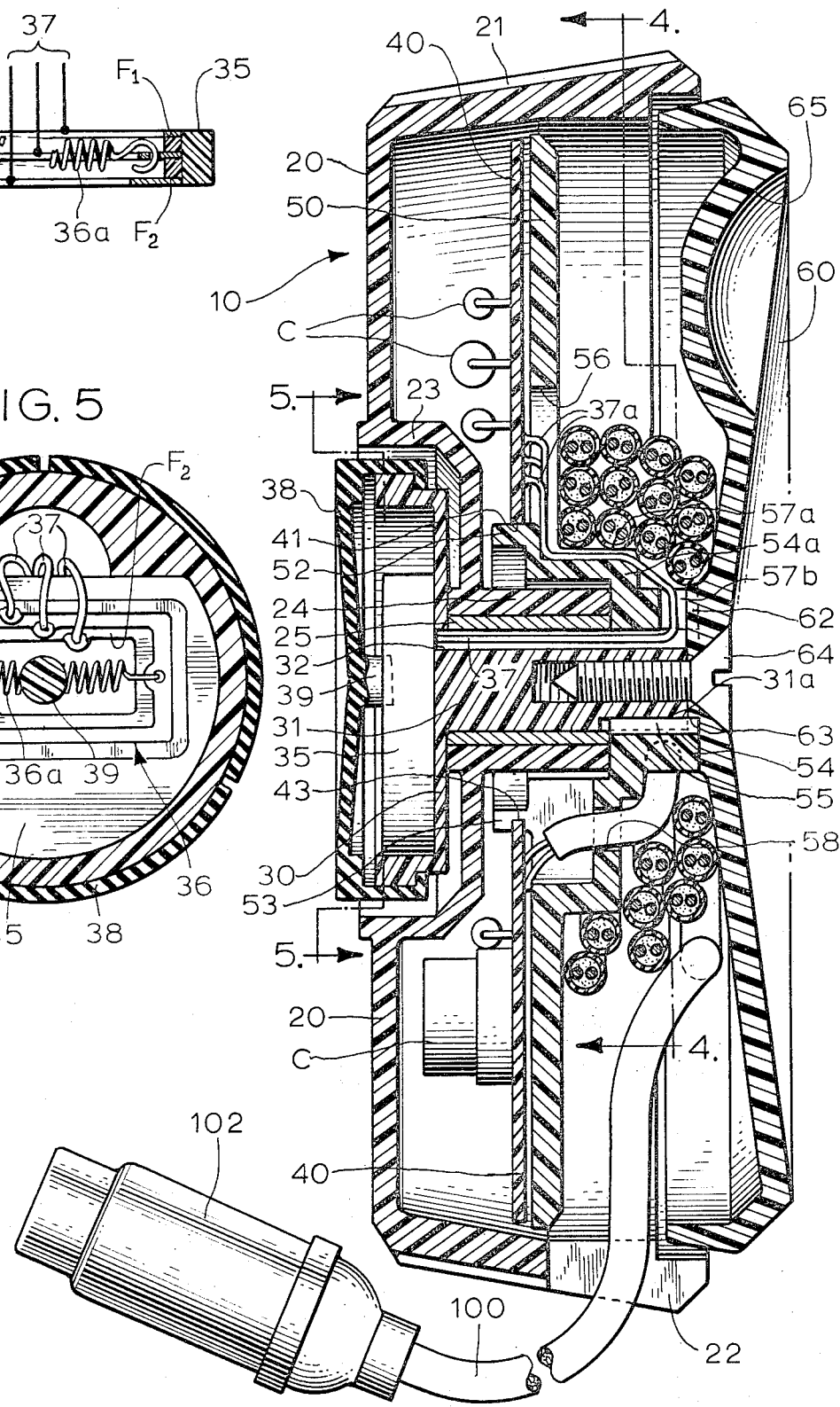

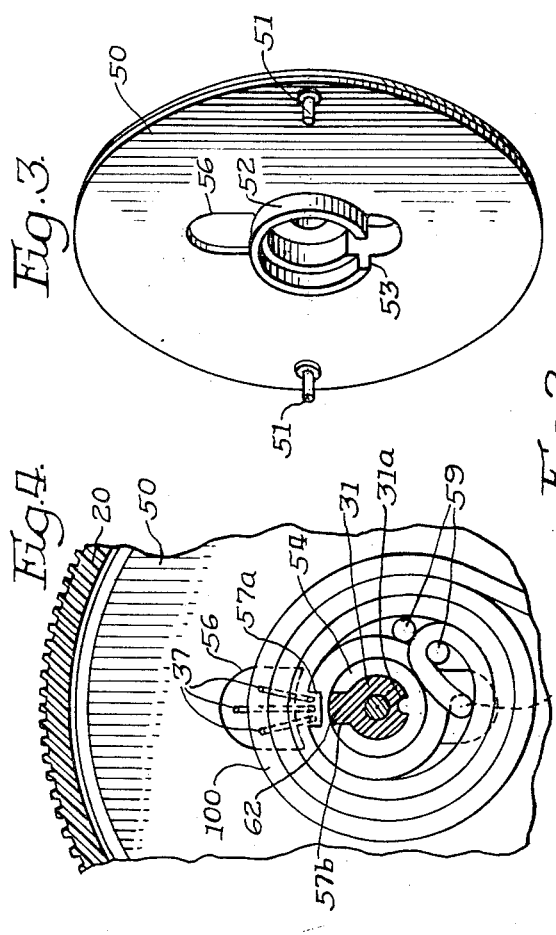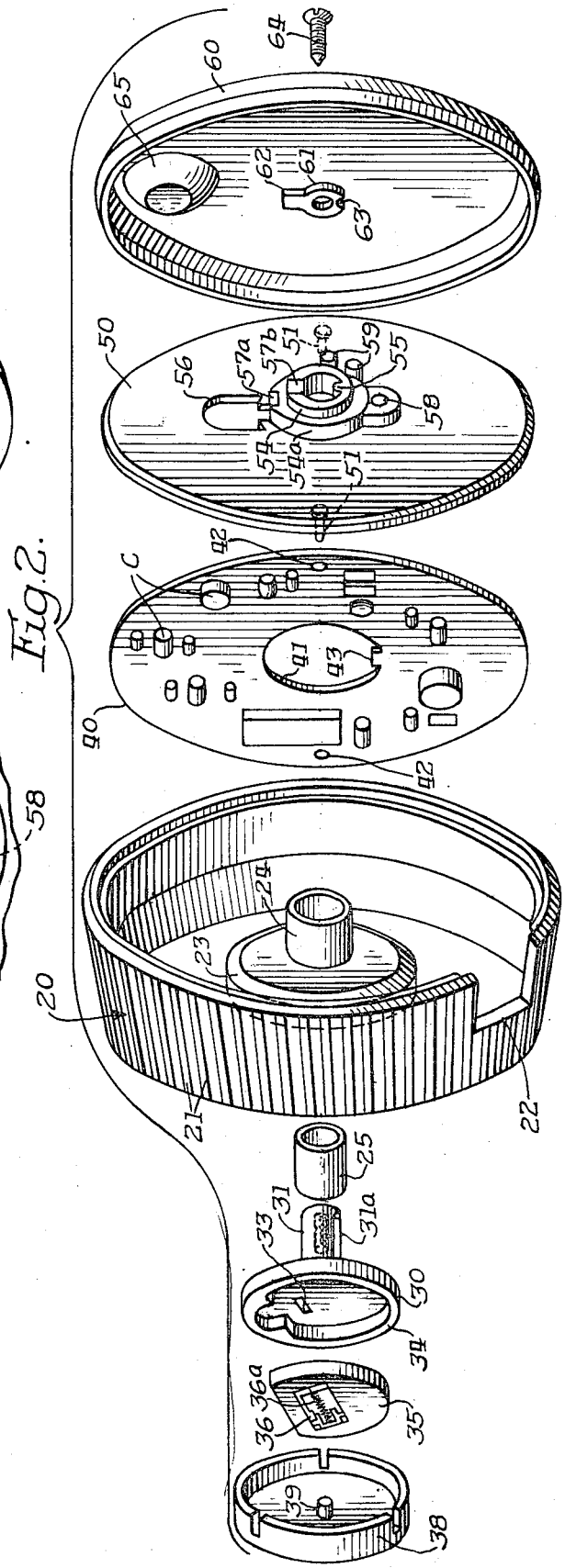

RETRACTABLE CORD ASSEMBLY WITH ELECTRIC SWITCH INTEGRALLY ASSOCIATED WITH ROTATABLE REEL HOUSING MEMBER

BACKGROUND AND GENERAL DESCRIPTION

This invention relates generally to a retractable cord reel system for the remote control of electrical devices such as film projectors, processor/viewers, and the like.

There is an increasing demand for a suitable system which will conveniently permit the remote control of electronic or electrical devices such as slide or movie projectors, processor/viewers, or other electrical systems and components. One of the basic problems in providing a suitable electrical remote control system has been the design and arrangement of the electrical components which are necessary for remote switching. The switching must be arranged so that the extension and take-up of the power cord, which couples the remote control device to the unit being controlled, does not cause any electrical discontinuity. Moreover, electrical continuity must be maintained between the electrical switch components and the power cord, regardless of the extended or retracted position of the power cord.

The necessary electrical coupling for remote control systems often has been accomplished by providing comutator brushes or the like which would permit the power cord to be withdrawn and taken up on a rotatable reel without disrupting the electrical continuity of the system. Those prior systems have presented problems in some cases of causing excessive wear, and increased maintenance and production costs. The sliding comutator brushes must be adjusted in manufacturing, to assure continuous electrical contact with a rotating or sliding contact member. Further, the brushes had to be inspected periodically, and are subject to corrosion and wear which limited the potential life of the remote control system.

Accordingly, the object of this invention is to provide an electrical remote control system which overcomes the above-noted problems in prior systems by eliminating the need for comutator brushes or other sliding contacts to maintain the electrical continuity between the switching system and the retractable power cord. Briefly described, the remote control system in accordance with this invention includes a stationary housing member and a rotatable switch assembly positioned on one side of the housing member. A rotatable base plate including electrical circuit means is positioned on the other side of the stationary housing and is coupled for rotation with the switch assembly. A power cord has a free end adapted for connection to the device to be remotely controlled. The terminal end of the power cord is permanently fixed for rotation with the rotatable base member and is electrically coupled to the circuit means. The base member and the switch assembly thereby rotate in unison with respect to the stationary housing to coil or extend the cord. The switch can be operated at any position of the power cord.

EXEMPLARY EMBODIMENT

Further objects and features of the present invention will become more apparent from the following description of an exemplary embodiment thereof, taken in conjunction with the accompanying drawings, in which:

FIG. 1 is a cross-sectional plan view of the electrical remote control system in accordance with the present invention;

FIG. 2 is an exploded perspective view of the components of the remote control system illustrated in FIG. 1;

FIG. 3 is a removed rearward perspective view of the rotatable base plate incorporated in the system illustrated in FIGS. 1 and 2;

FIG. 4 is a partial cross-sectional view of the remote control system, taken along the line 4—4 in FIG. 1; and FIG. 5 is a cross-sectional view of the switch incorporated in the remote control system, taken along the line 5—5 in FIG. 1; and FIG. 6 is a schematic plan view of the switch shown in FIG. 5, illustrating the movable and stationary fixed contacts in the switch.

The remote control system in accordance with the present invention is generally indicated in the drawings by the reference numeral 10. The power cord incorporated within the remote control system 10, for connecting the system to the electrical unit to be controlled, is generally indicated by the reference numeral 100. As seen in FIG. 1, a suitable electrical connector 102 is provided at the free end of the power cord 100 for connecting the system 10 to the controlled device. As shown in FIGS. 1 and 4, the power cord 100 is adapted to be coiled within the interior of the system 10 in a manner which permits the cord to be withdrawn for positioning the remote control system at any suitable location spaced from the device being controlled.

The remote control system 10 in accordance with this invention includes a stationary cylindrical housing 20. The housing 20 is provided with a series of exterior gripping serrations 21 which permit the housing to be gripped easily by an operator. The periphery of the housing 20 is also provided with a slot 22 through which the power cord 100 can travel as it is extended or retracted from the remote control system 10. As seen in FIGS. 1 and 2, the top center portion of the housing 20 defines a switch recess 23 for receiving a suitable remote control switch assembly. The central portion of the housing 20 also defines an axially extending hub 24. The hub 24 includes a central bore which receives a bushing 25.

The switch recess 23 is preferably circular in configuration so that the switch located in the recess will freely rotate during the extension or retraction of the cord 100. A circular switch base member 30 is provided in the system, and is dimensioned for positioning within the recess 23. The lower end of the base 30 includes an axle 31 which is machined to fit within the bushing 25. The axle 31 thereby allows the switch base 30 to rotate freely within the bushing 25 and the hub 24 during the operation of the remote control system 10. One side of the axle 31 includes an elongate groove 32 which is adapted to receive electrical connector wires 37 for the switch which is incorporated within the base 30.

As seen in FIG. 2, the top portion of the switch base 30 includes an opening 33 which is axially aligned with the recess 32. The top portion of the base 30 also defines a circular recess 34 adapted to receive a switch plate 35. A suitable electrical contact switch 36 is mounted on the switch plate 35, and is coupled with the wires 37. As explained further hereinafter, the wires 37 extend through the opening 33 and the groove 32 to connect the switch 36 to the external power cord 100.

The switch 36 can be of any suitable design needed to meet the conditions of the electrical unit being controlled by the system 10. In the illustrated embodiment, the switch 36 is an over-the-center switch which is operative to temporarily interrupt a circuit by depressing an over-center spring 36a incorporated in the switch. In the illustrated embodiment, the depression of the spring 36a snaps the movable contact M between the fixed contacts $F_1$ and $F_2$ to accomplish the switching operation. An actuating button 38 is provided in the remote control system 10 to operate the switch 36 at the desired time. The button 38 is preferably made of a resilient rubber-like material, an includes a central switch projection 39 positioned to engage with the switch spring 36a when the button 38 is depressed. As seen in FIGS. 1 and 2, the resilient button 38 is dimensioned to snap over the exterior portion of the switch base 30 when the system 10 is assembled. Hence, during the operation of the remote control system 10, the entire switch assembly including the button 38, the switch plate 35 incorporating the switch 36, and the switch base 30, is rotatable about the axle 31 within the bushing 25.

As seen in FIG. 1, the axle 31 is dimensioned so that when the switch base 30 is in position on the stationary base 20 the axle 31 projects downwardly beyond the hub 24. The axle 31 also includes a keyway 31a for receiving keys provided on the additional components of the remote control system 10.

The remote control system 10 in accordance with this invention further includes a rotatable printed circuit board 40. The circuit board 40 includes a central opening 41 which permits the board to be positioned within the stationary housing 20 over the hub 24. The board 40 includes suitable electronic components, generally indicated by the reference C, which are designed to perform the desired functions of the particular system in which the remote control system 10 is to be used. The circuit board 40 is dimensioned so that it can rotate freely within the interior of the stationary housing 20.

A rotatable base plate 50 is adapted to receive the printed circuit board 40. The plate 50 includes pegs 51 which fit within suitable holes 42 provided on the board 40, to permanently mount the board on the plate. A central boss 52 on the plate 50 mates with the opening 41 on the board 40 to assure the proper positioning of the circuit board. In addition, a key 43 provided on the board 40 is received within a slot 53 provided on the boss 52 to align the circuit board properly on the plate 50.

As seen in FIG. 2, the lower side of the plate 50 includes a raised portion defining stepped bosses 54 and 54a. The boss 54 defines a key 55 which is dimensioned to be received within the keyway 31a provided on the axle 31 of the switch base 30. The key 55 locks the base 50 and the printed circuit board 40 in the proper circumferential position with respect to the switch base 30. The key 55 further assures that the switch base 30, the printed circuit board 40, and the base plate 50 will rotate in unison during operation of the remote control system 10.

As further seen in FIG. 2, the plate 50 includes a conductor aperture 56 positioned in alignment with a pair of aligned grooves 57a and 57b provided in the bosses 54 and 54a. The plate 50 is designed so that the aperture 56 and the grooves 57a and 57b are in axial alignment with the opening 33 and the groove 32 provided in the switch base 30.

Accordingly, the electrical switch conductor wires 37 can be directed through the opening 33, and can be extended through the grooves 57a and 57b and the aperture 56. Hence the terminal ends 37a of the wires 37 can be electrically coupled, at the desired point, to the printed circuit board 40, as seen in FIG. 1. Since the switch base 30, the printed circuit board 40 and the plate 50 rotate in unison, there will be no relative rotation between those components which would interfere with the electrical coupling between the switch 36 and the printed circuit board 40 provided by the above-described arrangement.

As seen in FIGS. 1 and 2, the rotatable base plate 50 also includes a cord aperture 58. The terminal end of the power cord 100 extends through the aperture 58 and is connected at a suitable location to the printed circuit board 40. Again, since there is no relative rotation between the base 50 and the printed circuit board 40, the extension and retraction of the power cord 100 will not interfere with the electrical connection between the cord 100 and the printed circuit board 40. The cord 100 leading from the aperture 58 is extended between a pair of strain relief stakes 59 provided on the base 50. The stakes 59 permit the cord to be extended or coiled around the bosses 54 and 54a during the operation of the remote control device 10, without transmitting any shock forces or tension loads through the power cord 100 which could otherwise loosen the electrical connection between the cord and the printed circuit board 40. Furthermore, the recessing of the switch wires 37 within the slots 57a and 57b permit the power cord 100 to be coiled around the bosses 54 and 54a without transmitting any forces to the wires 37.

The remote control system 10 in accordance with this invention further includes a rotatable lower cover plate 60. As seen in FIGS. 1 and 2, the cover plate 60 includes a boss 61 which is adapted to be received within the axial recess provided in the boss 54 on the base plate 50. In addition, the boss 61 includes a key 62 which mates with the groove 57b on the boss 54 after the wires 37 are extended through the slot 57b. Additionally, a keyway 63 on the boss 61 engages with the key 55 provided in the boss 54. By this arrangement, the cover plate 60 is keyed to the base plate 50 and will rotate in unison with the plate 50, the printed circuit board 40, and the switch base 30. A machine screw 64, or other suitable fastening means, is provided to rigidly join the cover plate 60 to the base plate 50 and printed circuit board 40, by engaging with a threaded opening provided in the axle 31 of the switch base 30.

As further seen in FIGS. 1 and 2, the cover plate 60 has a slight concave configuration to provide a smooth and inclined internal surface along which the power cord 100 is coiled during the operation of the remote control device 10. In addition, the cover plate 60 includes a recess 65, or other suitable means, for externally rotating the cover plate 60 during the operation of the remote control system 10.

The operation of the remote control system 10 in accordance with this invention is apparent from the above description of the system components. Initially, the power cord 100 is stored within the system 10 by being coiled around the bosses 54 and 54a between the cover plate 60 in the base plate 50. If it is desired to extend the cord 100 to position the system 10 at a location remote from the electrical system to be controlled, the cord 100 is pulled through the slot 22 provided in the stationary housing 20. If the housing 20 is held stationary by the operator, the pulling force on the power cord 100 will uncoil the power cord 100 by causing simultaneous rotation of the cover plate 60; the base plate 50; the printed circuit board 40; and the switch base 30. As the cord 100 is being uncoiled, the strain relief stakes 59 prevent the transfer of any substantial stress forces to the electrical connection joining the power cord 100 to the printed circuit board 40. The cord 100 may be extended partially or completely. At any position of the power cord 100, the switch button 38 can be activated to energize the switch 36. Accordingly, the remote control system 10 can be placed at any position remote from the system being controlled, within the length of the power cord 100, and can be immediately operated by depressing the switch button 38.

When it is desired to recoil the extended power cord 100, such as after the operation of the remote control system 10 as completed, the operator of the system manually rotates the cover plate 60 by using the recess 65. This rotation of the cover plate 60 simultaneously rotates the base plate 50, the printed circuit board 40 and the switching assembly including the switch base 30.

From the above description it is apparent that the power cord 100 can be extended and recoiled during the operation of the system 10 without any sliding comutator brushes or the like to maintain electrical continuity between the switch button 38, the printed circuit board 40, and the power cord 100. Since the electrical components in the system 10 in accordance with this invention rotate in unison, no unnecessary strain is placed upon the electrical connections in the system.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention.

What is claimed is:

1. A remote control system for permitting the remote control of electrical devices comprising:
    a stationary housing;
    a rotatable switch positioned on one side of said housing;
    a rotatable base plate including electrical conductor means positioned on the other side of said stationary housing and electrically connected to said switch; and
    coupling means joining said base plate for rotation with said switch;
    an elongate electrical control cord for coupling said remote control system to an electrical device to be controlled, said cord having a free end adapted for electrical connection to said controlled device and further having a terminal end permanently affixed for rotation with said rotatable base plate, the terminal end of said cord further being electrically connected to said conductor means provided on said base; plate; and
    means to rotate said switch and base plate in unison with respect to said housing to retract said cord within said housing;
    whereby said rotation of said base plate and said switch in unison with respect to said stationary housing permits the operation of said switch at any location of said cord without relative rotation between said base plate conductor means, and said switch.

2. A remote control device in accordance with claim 1 wherein said stationary housing includes a switch recess, and wherein said switch is positioned for rotation within said recess.

3. A remote control system in accordance with claim 1 wherein said means to rotate said switch and base plate in unison comprises a rotatable cover plate positioned in spaced relationship with respect to said base plate and joined for rotation therewith so that said cord is retracted between said base plate and said cover plate.

4. A remote control system in accordance with claim 3 wherein said rotatable base plate includes strain relief means which secure the cord adjacent the terminal end thereof to relieve the strain on said cord and the electrical connection between said cord and said conductor means during the movement of said cord.

5. A remote control system for use in activating an electrical device from a remote location, said system comprising:
    a stationary generally cylindrical housing including an axially extending hub member;
    a switch rotatably mounted on said housing;
    a base member positioned within said housing;
    axle means extending through said hub member and joining said base member for rotation in unison with said switch;
    first electrical conductor means joined to said base member for rotation with said base member and said switch;
    second electrical conductor means rotatable with said switch and said base member and coupling said switch to said first conductor means;
    an elongated cord having a free end adapted to electrically couple said remote control system to an external electrical device to be controlled, and further having a terminal end connected for rotation with said base member and electrically coupled to said first conductor means; and
    means to rotate said switch and base member in unison with respect to said housing;
    said cord being arranged within said housing so that rotation of said base member retracts said cord within said housing while simultaneously rotating said switch, base member and first and second conductor means, whereby the remote control system permits the operation of said switch at a plurality of locations for said cord without substantial relative movement between said switch and terminal end of said cord, and the electrical continuity of said remote control system is readily maintained.

6. A remote control system in accordance with claim 5 wherein said means to rotate said base member comprises a rotatable cover plate positioned in spaced relationship with respect to said base member and joined for rotation therewith so that said cord retracts between said base member and said cover plate.

7. A remote control system for permitting the remote control of electrical devices comprising:
   a stationary housing;
   a rotatable switch positioned on one side of said housing;
   a rotatable base member positioned on the other side of said housing;
   coupling means joining said base member for rotation with said switch;
   an elongate electrical control cord for electrically coupling said remote control system to an electrical device to be controlled, said cord having a free end adopted for electrical connection to said control device and further having a terminal end permanently affixed for rotation with said rotatable base member;
   conductor means rotatable with said switch and said base member and electrically coupling said switch to said terminal end of said cord; and
   means to rotate said switch and base member in unison with respect to said housing to retract said cord within said housing; so that said rotation of said switch, said conductor means and said base member in unison permits operation of said switch at any location of said cord without relative rotation between said switch, conductor means and base member.

* * * * *